United States Patent

Roumagnac

[11] Patent Number: 5,770,169
[45] Date of Patent: Jun. 23, 1998

[54] ROTARY DRUM STRUCTURE FOR A STERILIZING APPARATUS

[75] Inventor: Jean-Patrick Roumagnac, Le Coteau, France

[73] Assignee: Barriquand Steriflow, Roanne, France

[21] Appl. No.: 569,222

[22] PCT Filed: Jun. 28, 1994

[86] PCT No.: PCT/FR94/00778

§ 371 Date: Dec. 28, 1995

§ 102(e) Date: Dec. 28, 1995

[87] PCT Pub. No.: WO95/01107

PCT Pub. Date: Jan. 12, 1995

[30] Foreign Application Priority Data

Jun. 29, 1993 [FR] France .................................. 93 07891

[51] Int. Cl.⁶ ........................................................ A61L 9/00
[52] U.S. Cl. .......................... 422/297; 414/149; 422/300; 422/307; 422/310
[58] Field of Search .................................... 422/292, 295, 422/297, 300, 307, 310; 414/149, 153

[56] References Cited

U.S. PATENT DOCUMENTS 2,065,752 12/1936 Schmidt .
3,532,049 10/1970 Smith .
3,744,402 7/1973 Piegza et al. .............................. 99/360
4,722,295 2/1988 Young ..................................... 118/416
5,057,288 10/1991 Möllenkamp ....................... 422/297 X
5,362,456 11/1994 Möllenkamp ....................... 422/297 X

FOREIGN PATENT DOCUMENTS 0292041 11/1988 European Pat. Off. .
2680688 3/1993 France .
9207478 5/1992 WIPO .

*Primary Examiner*—Krisanne Thornton
*Attorney, Agent, or Firm*—Oppenheimer Poms Smith

[57] ABSTRACT

The invention relates to a rotary drum structure for a sterilizer. The structure includes: four beams (30, 32, 34, 36) disposed parallel to said axis and defining a rectangular parallelepiped volume; a plurality of spacer elements (52, 54, 56) disposed in the four faces defining said parallelepiped volume and forming triangulated structures; a second end part (60) fixed to second ends of the beams to define an inlet opening (64) into said drum; and a circular running path (62).

6 Claims, 3 Drawing Sheets

ROTARY DRUM STRUCTURE FOR A STERILIZING APPARATUS

The present invention relates to a rotary drum structure for a sterilizer of the rotary drum type.

Objects or products in the food and pharmaceutical industries, such as boxes, jars or dishes, flasks, etc. are often sterilized in so-called discontinuous sterilizers or autoclaves into which the products to be treated are inserted and from which they are extracted after the intended treatment cycle. Such products to be treated are disposed in baskets, stackable trays, or other similar storage elements.

For some such products, sterilization heat treatment must be performed while the product is being stirred within its packaging. Stirring is produced by rotating a drum inside the sterilizer, which drum encloses baskets filled with the packages of products to be sterilized that are contained therein. The same type of problem arises when it is desired to drip or tilt certain products into an autoclave type of device which is then referred to as a dripper or a tilter. This operation makes it possible to remove the water deposited on the products by gravity during sterilization.

Patent application WO-A-93/04707 describes a rotary drum autoclave or sterilizer, and in particular means for holding baskets inside the rotary drum.

Accompanying FIG. 1 is a perspective view of the known way of implementing the rotary drum. In this figure, there can be seen a portion of the outer cylindrical case 10 of the sterilizer, and, partially extracted therefrom, the rotary drum assembly 12. The drum 12 is constituted by mutually parallel length members 14 constituted by tubes that define the periphery of the drum structure. The tubes 14 pass through circular sectors such as 16. The length members 14 are welded to the circular sectors 16 which are made of sheet metal. At the ends of this structure, there are to be found firstly a part 18 provided with an opening 20 for receiving baskets, and secondly a part 22 provided with means 24 for co-operating with rotary drive means 26 mounted on the enclosure 10. In addition, in this figure, there can be seen partially extended rails 28 resting on the bottom portion of the structure to enable baskets to be inserted and removed, which baskets contain the products to be treated.

That structure suffers from numerous drawbacks. Firstly, its lifetime is relatively short because of fatigue stresses of greater or lesser extent, because of the high rate at which treatment installations are used, and because of ever-increasing loads installed therein. Also, that type of structure is incapable of achieving a high degree of mechanical strength, thus giving rise to phenomena associated with bending, twisting and/or shear between the various component elements of the drum.

Such deformation has non-negligible effect on the efficiency of devices for holding objects that are secured to the structure. As a result there are high maintenance costs because of the frequent down times of the machine. Finally, such structures are heavy, thereby consuming a large amount of electrical energy in rotating the drum.

An object of the present invention is to provide a rotary drum structure for a rotary drum autoclave or sterilizer that has a structure which is lighter in weight and above all of greater stiffness and thus longer lifetime.

To achieve this end, the rotary drum structure for a sterilizer comprising an outer case having a longitudinal axis about which said drum is mounted to rotate is characterized in that it comprises:

four beam-forming elements disposed parallel to said axis and defining a rectangular parallelepiped volume;

a plurality of spacer elements disposed in the four faces defining said parallelepiped volume, each spacer element having a first end welded to one beam element and a second end welded to another beam element lying in the same face, the spacer elements and the beams forming triangulated structures;

a first end part fixed to a first end of the beam elements to define a rotary bearing disposed on said axis for rotation;

a second end part fixed to a second end of the beam elements to define an inlet opening into said drum; and means forming a circular running path secured to said beam elements, said running path having said axis for rotation as its axis of revolution, said running path being adapted to co-operate with rotary guide means secured to the inside face of the outer case of said sterilizer.

It will be understood that the above all-welded mechanical structure made up of four longitudinal beams interconnected by an all-welded structure constituted by spacers which preferably form a "triangulated" structure, there is obtained firstly very great overall stiffness for the structure with a high degree of resistance to bending, twisting, and shear, while simultaneously obtaining a structure of reduced weight given its mechanical qualities.

Other characteristics and advantages of the present invention appear more clearly on reading the following description of an embodiment of the invention given by way of non-limiting example. The description refers to the accompanying figures, in which:

Figure 2:
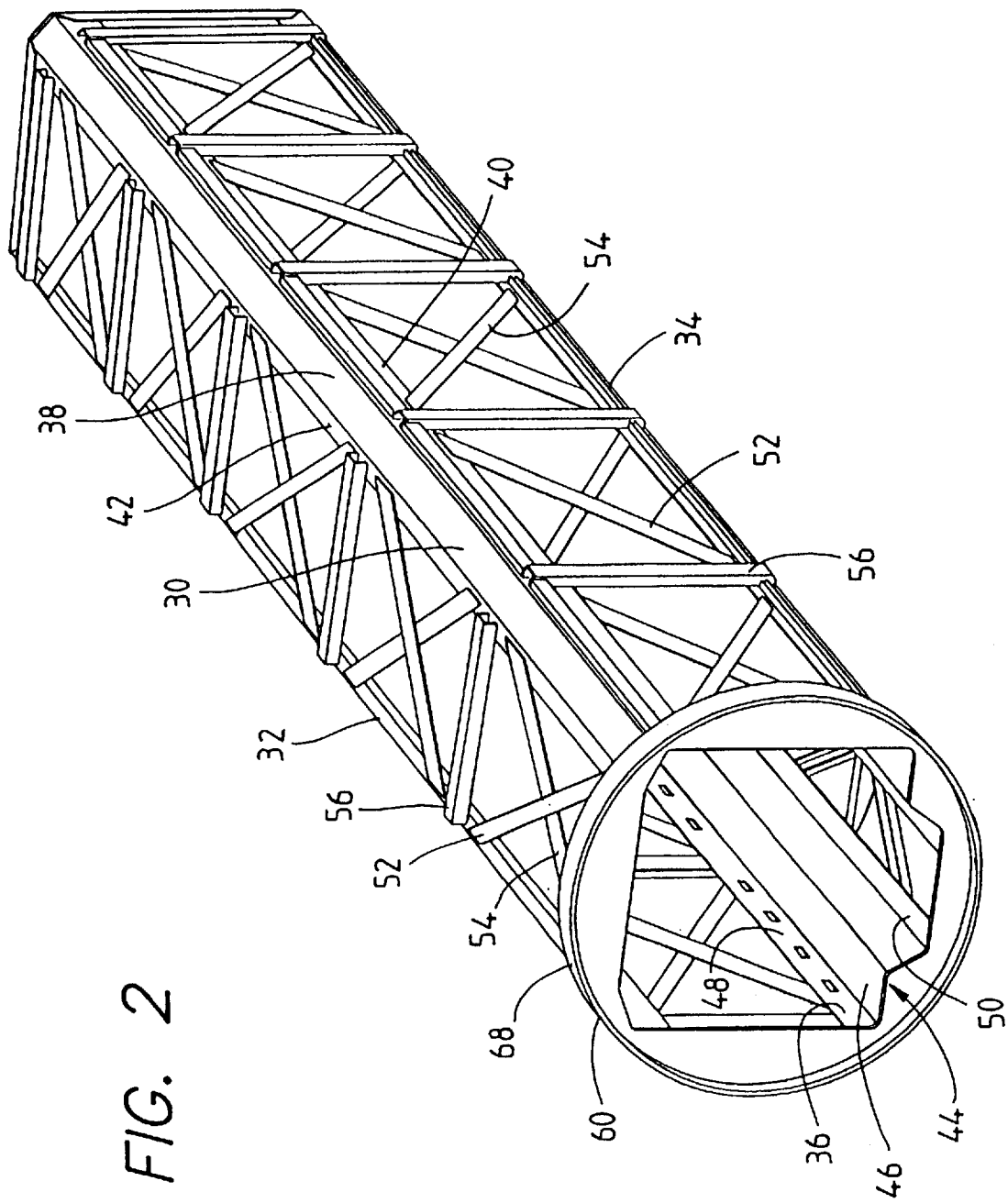
FIG. 2 is a perspective view of the drum structure of the invention.

The drum structure of the invention is described, initially with reference to FIG. 2. The drum structure essentially comprises four longitudinal beams 30, 32, 34, 36 disposed parallel to the axis of rotation of the drum. These four beams define a rectangular parallelepiped whose cross section is square or rectangular. Each top beam, i.e. the beams 30 and 32, comprises a web 38 and two fixing flanges 40 and 42. The cross section of the bottom beams 34 and 36 is more complex in that their webs 44 also define respective horizontal portions 46 having a function that is explained below. The bottom beams also have pairs of fixing flanges 48 and 50.

As can also be seen in FIG. 2, two beams defining the same face of the rectangular parallelepiped are interconnected by spacer-forming elements, or more precisely by a triangulated structure. These spacers are preferably constituted by alternating crossed diagonals such as 52 and 54, e.g. formed by flat bars, and crossmembers 56, e.g. constituted by channel section bars. The ends of each spacer 52, 54, 56 are welded to the flanges 40 and 42 of the top beams or 50 and 48 of the bottom beams. A structure is thus obtained which is very stiff and of weight that is relatively small given its stiffness. It will also be understood that it is easy to provide beams of a different length to adapt the length of the drum to the dimensions of the autoclave without that altering the general structure of the drum.

It is also clear that the spacers interconnecting longitudinal beams could be of a shape other than that shown in FIG. 2. The triangulated disposition and shape of the spacer assemblies must be designed as a function of the conditions in which the sterilizer is to be used so as to achieve the desired degree of stiffness.

Figure 3:
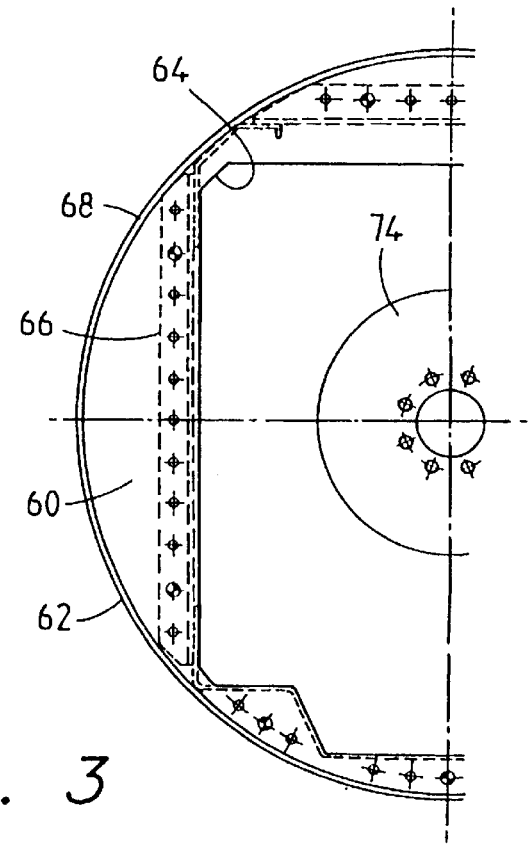
FIG. 3 is a half elevation view of the front part defining the opening of the drum.

As can also be seen in FIG. 2, the above-described structure further comprises a front part 60 which can be seen more clearly in FIG. 3. The front part 60 has a circular periphery 62 and an inside cutout 64 that preferably constitutes the opening of the drum. The shape of the inside cutout 64 naturally corresponds to the respective sections of the top beams 30 and 32 and of the bottom beams 34 and 36. The sheet metal forming the front part 60 is preferably fixed to the structure constituted by the beams and the various spacers by means of angle bars such as 66. These various parts are preferably assembled together by bolts. In a preferred embodiment, the front part 60 is provided around its periphery with a cylindrical flange 68 having the axis of rotation of the drum at its own axis of revolution. This cylindrical flange 68 constitutes a running path for guiding the drum in rotation inside the outer case of the sterilizer, as explained below.

Figure 5:
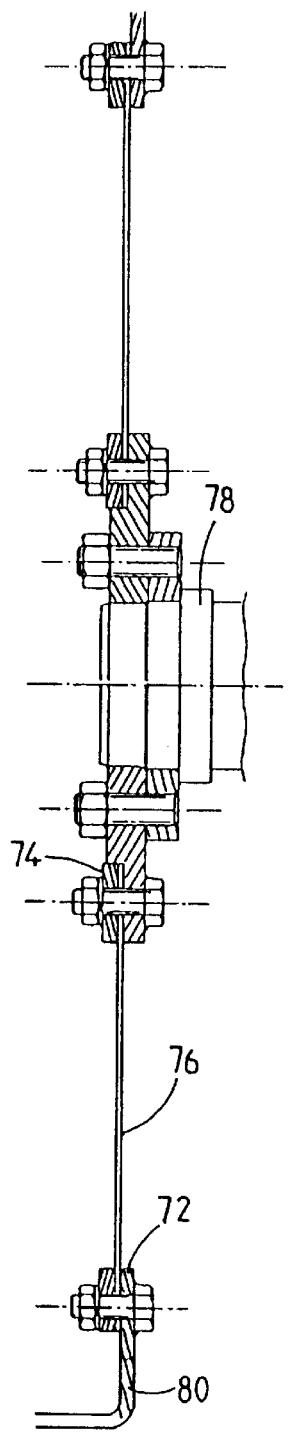
FIG. 5 is a side view in section of the rear part.
Figure 4:
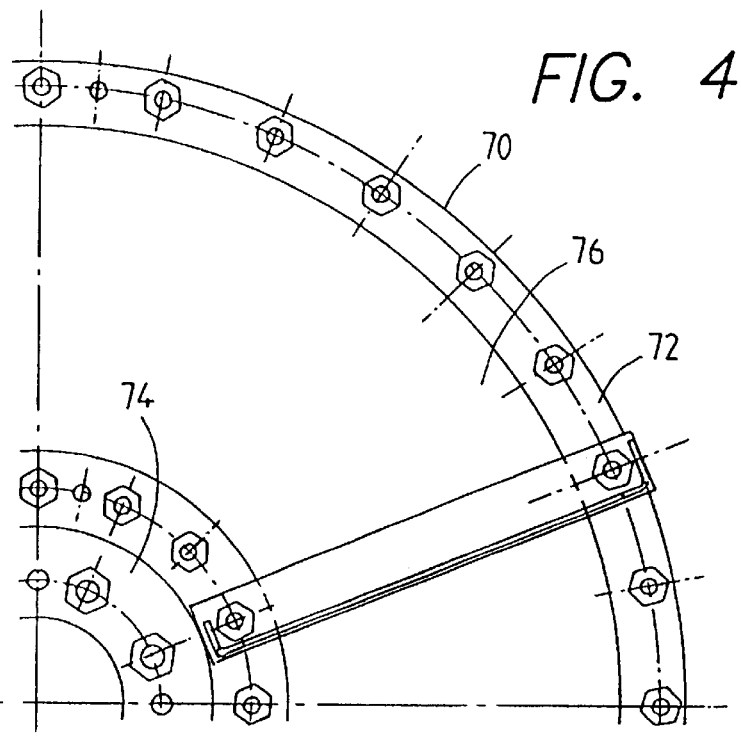
FIG. 4 is a one-fourth elevation view of the rear part serving to define the axis of rotation of the drum.

At its other end, the drum structure is provided with a rear part given reference 70 and shown in greater detail in FIGS. 4 and 5. This rear part serves to connect a hub for driving the drum in rotation to the remainder of the drum structure. This part 70 comprises an outer circular ring 72 which is connected to an inside portion 74 that forms the hub by means of a skin or web 76 that extends between the periphery of the hub and the outer ring 72.

As shown diagrammatically in FIG. 5, a rotary drive shaft 78 passing through the end wall of the sterilizer case is engaged in the hub 74. As also shown in FIG. 5, the outer ring 72 is secured to metal sheet 80 which is itself secured to the end of the drum structure.

The rear part 70 is preferably bolted to the triangulated structure of the drum.

Figure 1:
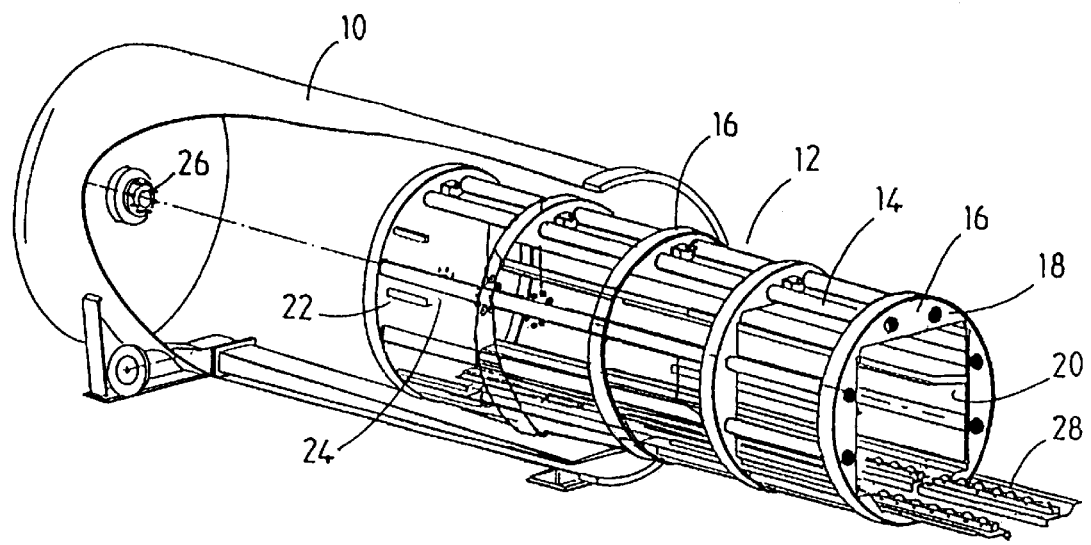
FIG. 1 is already described above and is a perspective view of a prior art sterilizer rotary drum.
Figure 6:
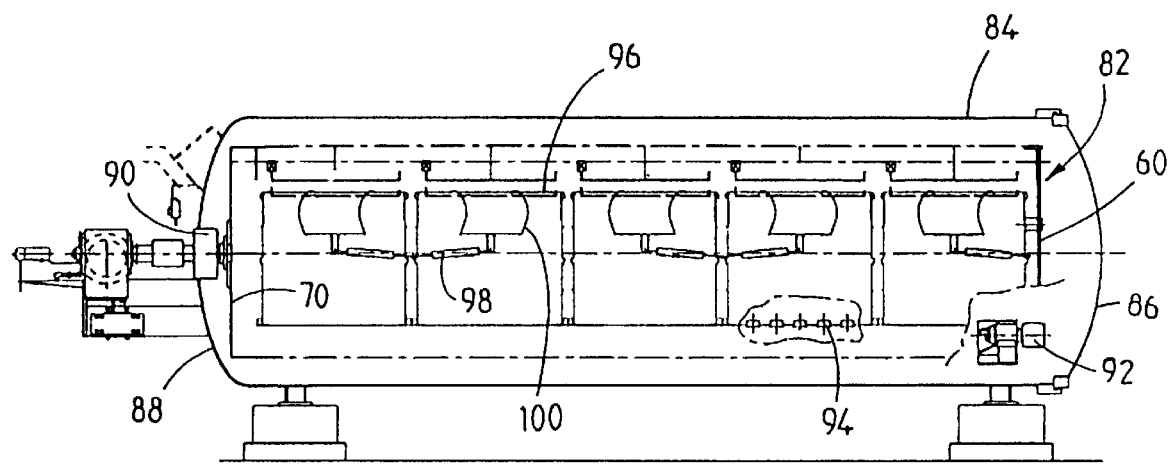
FIG. 6 is an axial section view of an autoclave or sterilizer including a rotary drum of the invention.

In FIG. 6, there can be seen the sterilizer as a whole including the drum as described with reference to FIGS. 2 to 5, which drum is given overall reference 82. In this figure, there can also be seen the outer cylindrical case 84 of the sterilizer, its sealed front door 86, and its end wall 88. Through the end wall 88, there is shown in simplified manner a passage for the rotary drive shaft 90 that co-operates with the rear part 70 of the drum. The figure also shows wheels such as 92 for providing rotary guidance that are mounted inside the outer enclosure 84 and that co-operate with the running path 68 of the front part 60 of the drum. Also shown in this figure, in simplified manner, are guide rails for trays inserted into the drum, referenced 94, and mounted on the horizontal portions 46 of the webs of the bottom beams 34 and 36. Finally, this figure also shows presser plates 96 which serve to hold stationary and keep in rotation the baskets once they have been inserted into the drum. These presser plates are controlled by systems comprising actuators 98 and levers 100 as described in detail in the above-mentioned PCT patent application.

It should be observed that given the way in which the substantially plane top face of the drum is implemented, installation of the presser plates is facilitated compared with prior art drums where the general shape is cylindrical. In addition, the great stiffness of the structure ensures greater effectiveness of the presser plates and more uniform pressing force.

Naturally, it would not go beyond the invention to provide the longitudinal beams of the drum with cross sections other than those shown in FIG. 2. Also naturally, the triangulated structure constituted by spacer elements could be given some other configuration adapted to the particular mechanical stresses on a drum.

Also naturally, the running path 68 need not be fixed to the periphery of the end part 60, but could be secured to an intermediate portion of the beams 30 to 36. The open end of the drum would then be cantilevered out.

Also naturally, a plurality of running paths 68 could be provided that are spaced apart along the length of the drum to provide even better rotary guidance and to avoid any risk of bending in the event of the load to be treated being large.

I claim:

1. A rotary drum structure for a sterilizer including an outer case having a longitudinal axis about which the drum is mounted to rotate, the structure comprising:

four beam-forming elements disposed parallel to said axis and defining a rectangular parallelepiped volume for receiving objects to be sterilized;

a plurality of spacer elements disposed in the four faces defining said parallelepiped volume, each spacer element having a first end welded to one beam element and a second end welded to another beam element lying in the same face, the spacer elements and the beams forming triangulated structures;

a first end part fixed to a first end of the beam elements to define a central rotary bearing disposed on said axis for rotation, the central rotary bearing disposed in the center of said first end part;

a rotary drive shaft adapted to co-operate with said central rotary bearing;

a second end part fixed to a second end of the beam elements to define an inlet opening into said drum; and means forming a circular running path secured to said second end part, said running path having axis for rotation at its axis of revolution, said running path being adapted to co-operated with rotary guide means secured to an inside face of the outer case of said sterilizer.

2. A drum structure according to claim 1 wherein each of the two beam-forming elements defining the bottom face of said volume has a respective web defining an internal horizontal guide rail on which to receive objects.

3. A drum structure according to claim 1 wherein said spacer elements associated with said pairs of beam elements are constituted by alternating crossed diagonals and cross members.

4. A drum structure according to claim 1 wherein said second end part is constituted by a plate having a circular periphery and said running path comprises a cylindrical flange secured to the periphery of said plate.

5. A drum structure according to claim 1 wherein said first end part comprises a web whose outer periphery is secured to said first ends of said beam-forming elements, and whose inner periphery is secured to hub-forming means.

6. A rotary drum structure for sterilizing objects, comprising:

four beam-forming elements arranged as a parallelepiped;

cross-braces secured between the beam-forming elements to form triangular structures between adjacent beams, the volume within the parallelepiped being generally unobstructed by the cross-braces so as to be capable of freely receiving objects to be sterilized therewithin;

a first end piece secured to a first end of the parallelepiped;

a first drive shaft centrally secured to the first end piece to rotate and support the parallelepiped thereat;

a second end piece secured to a second parallelepiped end opposite said first end, the second end piece having an aperture through which the objects to be sterilized may pass into the volume of the parallelepiped;

circular running path secured to the parallelepiped;

wheels mounted to an outer enclosure, said wheels co-operating with said circular running path to provide support for the parallelepiped as it rotates.

* * * * *